US009517415B2

(12) United States Patent
Muench et al.

(10) Patent No.: US 9,517,415 B2
(45) Date of Patent: Dec. 13, 2016

(54) METHOD AND SYSTEM FOR GENERATING AUGMENTED REALITY WITH A DISPLAY OF A MOTOR VEHICLE

(71) Applicant: Harman Becker Automotive Systems GmbH, Karlsbad (DE)

(72) Inventors: Tobias Muench, Straubenhardt (DE); Philipp Schmauderer, Hoefen (DE); Christoph Benz, Ohlsbach (DE); Andreas Koerner, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 84 days.

(21) Appl. No.: 13/722,819

(22) Filed: Dec. 20, 2012

(65) Prior Publication Data
US 2013/0162639 A1 Jun. 27, 2013

(30) Foreign Application Priority Data
Dec. 21, 2011 (EP) .................................... 11010066

(51) Int. Cl.
*G06T 11/60* (2006.01)
*A63F 13/655* (2014.01)
(Continued)

(52) U.S. Cl.
CPC ............. *A63F 13/655* (2014.09); *A63F 13/52* (2014.09); *A63F 13/803* (2014.09);
(Continued)

(58) Field of Classification Search
CPC ....................................................... G06F 3/012
(Continued)

(56) References Cited

U.S. PATENT DOCUMENTS
2005/0071082 A1   3/2005   Ohmura et al.
2006/0105838 A1   5/2006   Mullen
(Continued)

FOREIGN PATENT DOCUMENTS
CN        102193625 A      9/2011
EP           1720131 B1    4/2009
(Continued)

OTHER PUBLICATIONS

Hutchings, http://www.psfk.com/2011/08/the-aeon-project-ar-virtual-reality-in-vehicles.html, "The Aeon Project: AR & Virtual Reality in Vehicles—PSFK", Aug. 3, 2011, 7 pages.
(Continued)

*Primary Examiner* — Phi Hoang
(74) *Attorney, Agent, or Firm* — Brooks Kushman P.C.

(57) ABSTRACT

A method and system for generating augmented reality with a display of a vehicle is provided. The method comprises recording an image of an environment of the vehicle in the form of image data, determining a virtual space in three dimensions from the image data, and detecting a real object in the image data. The method further comprises determining a first coordinate range of the real object in the three dimensional virtual space, adding a virtual element to the three dimensional virtual space, and controlling the virtual element in the three dimensional virtual space based on a user input. The method further comprises outputting the environment and the controlled virtual element in combined form in an output image, modifying the output image when the first coordinate range of the real object and a second coordinate range of the controlled virtual element form an intersection area, and displaying the output image.

15 Claims, 3 Drawing Sheets

(51) Int. Cl.
*A63F 13/803* (2014.01)
*A63F 13/52* (2014.01)
*G06T 19/00* (2011.01)

(52) U.S. Cl.
CPC ...... *G06T 19/006* (2013.01); *A63F 2300/205* (2013.01); *A63F 2300/6661* (2013.01); *A63F 2300/69* (2013.01)

(58) Field of Classification Search
USPC .......................................... 345/633; 715/810
See application file for complete search history.

(56) References Cited

U.S. PATENT DOCUMENTS

| | | | | |
|---|---|---|---|---|
| 2007/0268067 | A1* | 11/2007 | Bernhard | G01S 5/0252 327/558 |
| 2008/0111832 | A1* | 5/2008 | Emam et al. | 345/633 |
| 2010/0287500 | A1* | 11/2010 | Whitlow et al. | 715/810 |
| 2010/0296700 | A1* | 11/2010 | Walter et al. | 382/103 |
| 2011/0080481 | A1* | 4/2011 | Bellingham | B60R 1/12 348/148 |
| 2011/0205243 | A1 | 8/2011 | Matsuda | |

FOREIGN PATENT DOCUMENTS

| | | |
|---|---|---|
| JP | 11250273 A | 9/1999 |
| JP | 2005127995 A | 5/2005 |

OTHER PUBLICATIONS

Saket, http://techsplurge.com/3214/mega-list-33-awesome-augmented-reality-apps-games-android/, "36 Awesome Augmented Reality Apps & Games for Android", Mar. 17, 2011, 23 pages.
European Search Report for corresponding Application No. 11010066.6, mailed Mar. 21, 2012, 8 pages.
Japanese Office Action for corresponding Application No. 2012-278230, mailed Oct. 25, 2013, 4 pages.
Korean Office Action for corresponding Application No. 10-2012-0150379, mailed Mar. 10, 2014, 5 pages.
Chinese Office Action for corresponding Application No. 201210557143.3, mailed Mar. 26, 2015, 10 pages.
Xue-Ling et al., "Outdoor AR Spatial Information Representation and Its Virtual-real Registration Methods", Journal of Wuhan University of Technology, vol. 32, No. 12, Jun. 2010, 4 pages.

* cited by examiner

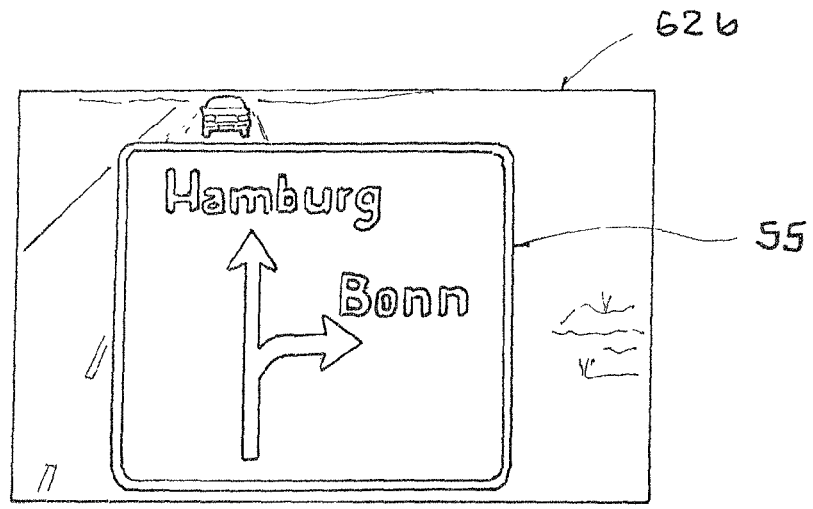
FIG. 3b
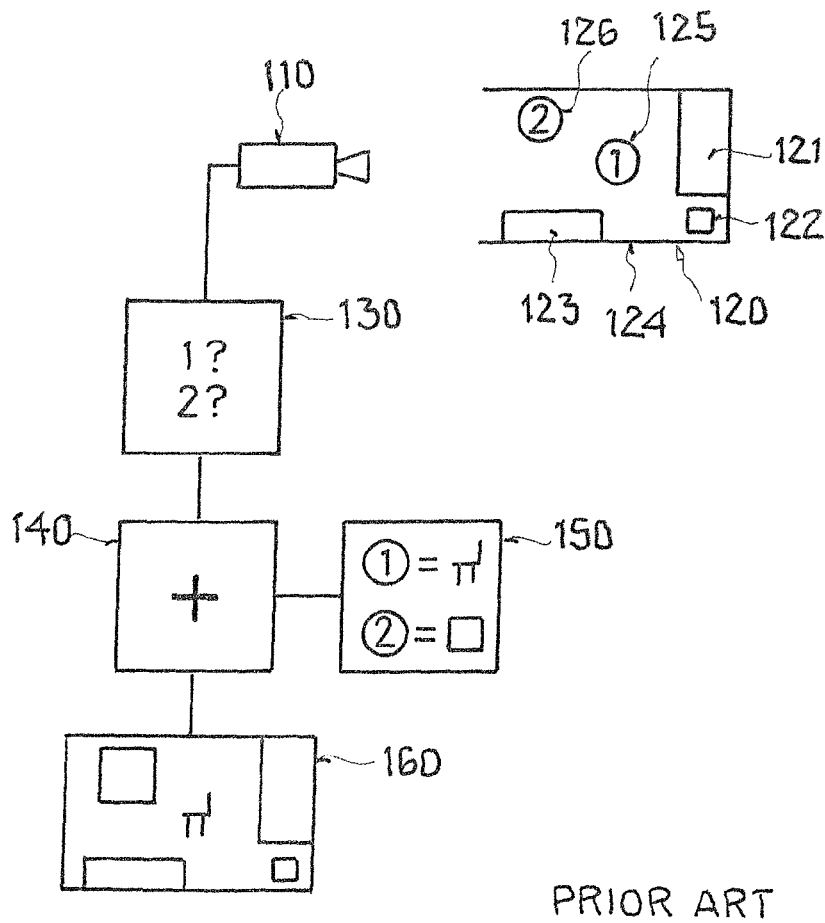
PRIOR ART    FIG. 4

METHOD AND SYSTEM FOR GENERATING AUGMENTED REALITY WITH A DISPLAY OF A MOTOR VEHICLE

CROSS-REFERENCE TO RELATED APPLICATIONS

This application claims the benefit of EP Application No. 11010066.6-1522 filed Dec. 21, 2011, the disclosure of which is incorporated in its entirety by reference herein.

TECHNICAL FIELD

Various embodiments relate to a method and a system for generating augmented reality with a display of a motor vehicle.

BACKGROUND

EP 1 720 131 B1 shows an augmented reality system with real marker object identification. FIG. 4 schematically shows in a simplified illustration an augmented reality system 100 thereof. The system 100 comprises a video camera 110 for gathering image data from a real environment 120. The real environment 120 represents any appropriate area, such as a room of a house, a portion of a specific landscape, or any other scene of interest. In FIG. 4, the real environment 120 represents a living room comprising a plurality of real objects 121 ... 124, for instance in the form of walls 124, and furniture 121, 122 and 123. Moreover, the real environment 120 comprises further real objects that are considered as marker objects 125, 126 which have any appropriate configuration so as to be readily identified by automated image processing algorithms. For instance, the marker objects 125, 126 have formed thereon significant patterns that may easily be identified, wherein the shape of the marker objects 125, 126 may be designed so as to allow identification thereof from a plurality of different viewing angles. The marker objects 125, 126 also represent substantially two-dimensional configurations having formed thereon respective identification patterns.

The system 100 further comprises a means 130 for identifying the marker objects 125, 126 on the basis of image data provided by the camera 110. The identifying means 130 may comprise well-known pattern recognition algorithms for comparing image data with predefined templates representing the marker objects 125, 126. For example, the identifying means 130 may have implemented therein an algorithm for converting an image obtained by the camera 110 into a black and white image on the basis of predefined illumination threshold values. The algorithm is further configured to divide the image into predefined segments, such as squares, and to search for pre-trained pattern templates in each of the segments, where the templates represent significant portions of the marker objects 125, 126.

First, the live video image is turned into a black and white image based on a lighting threshold value. This image is then searched for square regions. The software finds all the squares in the binary image, many of which are not the tracking markers, such as the objects 125, 126. For each square, the pattern inside the square is matched against some pre-trained pattern templates. If there is a match, then the software has found one of the tracking markers, such as the objects 125, 126. The software then uses the known square size and pattern orientation to calculate the position of the real video camera relative to the physical marker such as the objects 125, 126. Then, a 3×4 matrix is filled with the video camera's real world coordinates relative to the identified marker. This matrix is then used to set the position of the virtual camera coordinates. Since the virtual and real camera coordinates are the same, the computer graphics that are drawn precisely superimpose the real marker object at the specified position. Thereafter, a rendering engine is used for setting the virtual camera coordinates and drawing the virtual images.

The system 100 of FIG. 4 further comprises means 140 for combining the image data received from the camera 110 with object data obtained from an object data generator 150. The combining means 140 comprises a tracking system, a distance measurement system and a rendering system. Generally, the combining means 140 is configured to incorporate image data obtained from the generator 150 for a correspondingly identified marker object so as to create virtual image data representing a three-dimensional image of the environment 120 with additional virtual objects corresponding to the marker objects 125, 126. Hereby, the combining means 140 is configured to determine the respective positions of the marker objects 125, 126 within the real environment 120 and also to track a relative motion between the marker objects 125, 126 with respect to any static objects in the environment 120 and with respect to a point of view defined by the camera 110.

The system 100 of FIG. 4 further comprises a means 160 configured to provide the virtual image data, including the virtual objects generated by the generator 150, where, in preferred embodiments, the output means 160 is also configured to provide, in addition to image data, other types of data, such as audio data, olfactory data, tactile data, and the like. In operation, the camera 110 creates image data of the environment 120, where the image data corresponds to a dynamic state of the environment 120 which is represented by merely moving the camera 110 with respect to the environment 120, or by providing moveable objects within the environment, for instance the marker objects 125, 126, or one or more of the objects 121 ... 123 are moveable. The point of view of the environment 120 is changed by moving around the camera 110 within the environment 120, thereby allowing to observe especially the marker objects 125, 126 from different perspectives so as to enable the assessment of virtual objects created by the generator 150 from different points of view.

The image data provided by the camera 110 which is continuously updated, is received by the identifying means 130, which recognizes the marker objects 125, 126 and enables the tracking of the marker objects 125, 126 once they are identified, even if pattern recognition is hampered by continuously changing the point of view by, for instance, moving the camera 110 or the marker objects 125, 126. After identifying a predefined pattern associated with the marker objects 125, 126 within the image data, the identifying means 130 informs the combining means 140 about the presence of the marker object within a specified image data area and based on this information, the means 140 then continuously tracks the corresponding object represented by the image data used for identifying the marker objects 125, 126, assuming that the marker objects 125, 126 will not vanish over time. The process of identifying the marker objects 125, 126 is performed substantially continuously or is repeated on a regular basis so as to confirm the presence of the marker objects 125, 126 and also to verify or enhance the tracking accuracy of the combining means 140 creates the three-dimensional image data and superimposes corresponding three-dimensional image data received from the object generator 150, wherein the three-dimensional object data are permanently updated on the basis of the tracking operation of the means 140.

For instance, the means 140 may, based on the information of the identifying means 130, calculate the position of the camera 110 with respect to the marker objects 125, 126 and use this coordinate information for determining the coordinates of a virtual camera, thereby allowing a precise "overlay" of the object data delivered by the generator 150 with the image data of the marker objects 125, 126. The coordinate information also includes data on the relative orientation of the marker objects 125, 126 with respect to the camera 110, thereby enabling the combining means 140 to correctly adapt the orientation of the virtual object. Finally, the combined three-dimensional virtual image data is presented by the output means 160 in any appropriate form. For example, the output means 160 may comprise appropriate display means so as to visualize the environment 120 including virtual objects associated with the marker objects 125, 126. When operating the system 100, it is advantageous to pre-install recognition criteria for at least one marker object 125, 126 so as to allow a substantially reliable real-time image processing. Moreover, the correlation between a respective marker object and one or more virtual objects may be established prior to the operation of the system 100 or is designed so as to allow an interactive definition of an assignment of virtual objects to marker objects. For example, upon user request, virtual objects initially assigned to the marker object 125 are assigned to the marker object 126 and vice versa. Moreover, a plurality of virtual objects is assigned to a single marker object and a respective one of the plurality of virtual objects is selected by the user, by a software application.

SUMMARY

According to one aspect, an improvement to generating augmented reality in a motor vehicle is described through a method having the features of the independent claim 1, various refinements are the subject matter of dependent claims and included in the description.

Accordingly, a method for generating augmented reality in a motor vehicle is provided.

In the method, an image of the environment of the motor vehicle may be recorded in the form of image data. A virtual space may be determined from the image data.

In the method, a real object may be detected in the image data. A first coordinate range of the real object may be determined in the virtual space.

In the method, a virtual element having a second coordinate range may be added to the virtual space. The virtual element may be controlled based on a user input.

In the method, the environment and the controlled virtual element may be output in combined form in an output image. The output image may be modified when the first coordinate range of the real object and the second coordinate range of the controlled virtual element form an intersection area. The output image may be output by means of a display of the motor vehicle.

Due to one embodiment, the advantage is achieved in that the driver may interactively select a representation of objects in the environment of the vehicle. The object may be displayed temporally to assist the driver while driving. So the driver can focus on the current traffic situation and review the object, as for example, a traffic sign, which is then afterwards mixed with the current environment situation. Due to one embodiment, the advantage is achieved in that the current environment situation while traveling in the motor vehicle may be mixed with an artificial video game world, and events outside the vehicle are thus incorporated into the current game event thereby permitting interaction between the user and real objects from the environment.

The environment in this case may be the motor vehicle's real environment, which may be recorded using, for example, an optical system. The optical system is able to output corresponding digital image data. Additionally, an infrared camera or a radar system may be used. The virtual space determined from the image data may be a multidimensional space having at least three dimensions.

The real object detected in the image data may be a road sign or a car or the like, which may be at least temporarily visible from the motor vehicle. The object may be detected by means of algorithms of an image processing system. A movement of the object within the three-dimensional space may be tracked by a tracking algorithm. The first coordinate range of the real object may be the surface geometry of a road sign as well as the position of the surface geometry in the virtual space. The road sign may also have a thickness.

The virtual element and its second coordinate range may be generated, and its position and orientation in the virtual space preferably may be controlled by an arithmetic unit. The virtual element may be controlled as a function of the input by means of an input unit, such as a joystick or a touch screen. For the purpose of combination into the output image, the controlled virtual element may be displayed on a plane in front of the image data or in front of the real environment.

In another aspect, an improvement of an augmented reality system is described through the features of the independent claim 7. Various refinements are included in the description.

An augmented reality system of a motor vehicle is therefore provided.

The augmented reality system may have an image capture device which may be configured to record an image of the environment of the motor vehicle in the form of image data.

The augmented reality system may have an arithmetic unit which may be connected to the image capture device. The augmented reality system may have a control unit which may be connected to the arithmetic unit. The augmented reality system may have a display which may be connected to the control unit for the purpose of displaying an output image.

The arithmetic unit may be configured to determine a virtual space from the image data. The arithmetic unit may be configured to detect a real object in the image data. The arithmetic unit may be configured to determine a first coordinate range of the real object in the virtual space. The arithmetic unit may be configured to add a virtual element having a second coordinate range to the virtual space. The arithmetic unit may be configured to control the second coordinate range of the virtual element in the virtual space based on a user input, by means of the control unit.

The arithmetic unit may be configured to combine the environment and the controlled virtual element in the output image and to modify the output image when the first coordinate range of the real object and the second coordinate range of the controlled virtual element form an intersection area.

In one embodiment, the augmented reality system may be implemented as an infotainment system of the motor vehicle, the infotainment system being connected to the image capture device, for example, via cables.

The image capture system may be an optical system for recording image data. The image capture device may have a plurality of cameras, for example, complementary metal oxide silicone (CMOS) or charge-coupled device (CCD) cameras. The cameras may be situated for stereoscopic recording. The arithmetic unit may be a processor, in particular a central processing unit (CPU) or a digital signal processor (DSP).

The control unit may have an input circuit. A joystick or a touch screen or a gamepad may be connected to the input circuit. The display may be a liquid crystal display (LCD) or a projector for projecting the output image, in particular, onto a window pane.

The embodiments described below relate to both the method and the augmented reality system.

According to one embodiment, the virtual element may be controlled in three dimensions of the virtual space. It is possible to control a virtual flying element, such as, a virtual aero plan within the virtual space. It is also possible to use the virtual element to control a ballistic trajectory, for example, the throwing of balls. Alternatively, the controlled virtual element may be a virtual vehicle, for example, in a racing game.

In one embodiment, the virtual space may be determined in three dimensions based on a geometry of a traffic way in the environment. A distance may be ascertained based on the geometry of a road as the traffic way and the detected object may be situated in the ascertained distance within the virtual space.

According to one embodiment, the output image may be modified by supplementing or replacing object image data of the real object with a virtual object. The virtual object may display a hit marker in the form of a black dot or the like.

The output image may be modified by generating a virtual object from the object image data of the real object and outputting the virtual object in the output image. The virtual object, which looks just like the real object, may fly along a trajectory in the virtual space or split into multiple parts.

In one embodiment, a viewer position within the virtual space may be controlled by adapting the image data and the virtual element to the viewer position. The viewer position may be controlled from the driver's perspective or from the passenger's perspective. It is also possible to place the viewer position above the motor vehicle and add the motor vehicle itself to the output image as a virtual object.

The embodiments described above are particularly advantageous individually as well as in combination. All embodiments may be combined with each other. Some possible combinations are explained in the description of the exemplary embodiments in the figures. However, these possibilities illustrated therein for combining the embodiments are not final.

The invention is explained in greater detail below based on exemplary embodiments illustrated in the drawings.

BRIEF DESCRIPTION OF THE DRAWINGS

FIGS. 3a and 3b show schematic views of an output image; and

FIG. 4 shows a schematic view of an augmented reality system according to the prior art.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
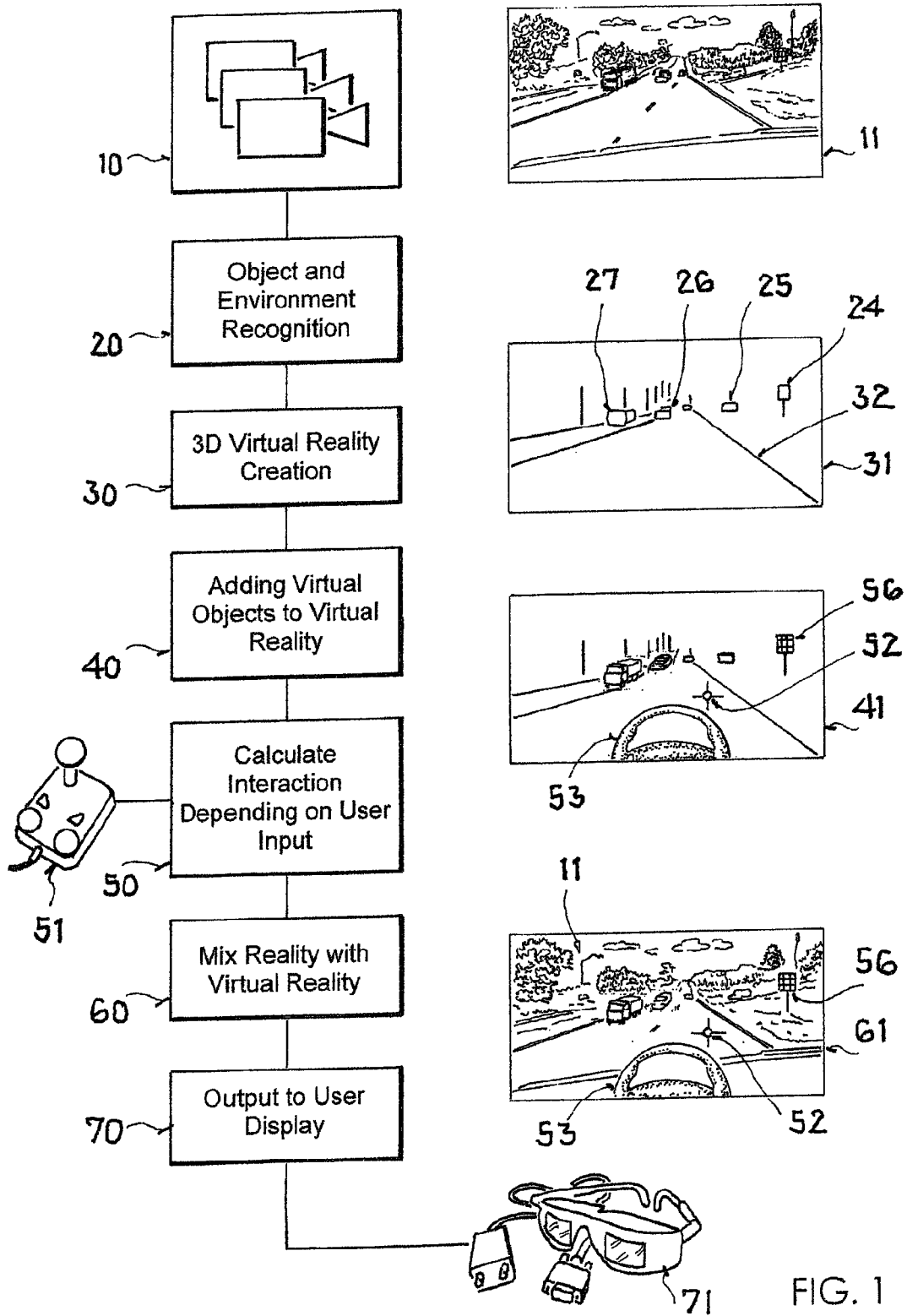
FIG. 1 shows a schematic diagram of a method for generating augmented reality in a motor vehicle.

FIG. 1 shows a schematic diagram of a method for generating augmented reality in a motor vehicle. The method is explained below for implementation of a video game. The technical requirements for video games may be established in the vehicle, for example to provide video games for passengers in the rear seats. Compared to conventional 2D and 3D games, which are available on the PC and consoles, a mixing with current reality may be achieved in the flowchart of FIG. 1. The environment of the vehicle may be integrated into the current game events. So-called first-person shooter games may represent images and sound in a fully calculated, three-dimensional space, as for example, on a head-up display 71.

In the flowchart in FIG. 1, image data 11 may first be recorded from the environment of the motor vehicle with the aid of a plurality of cameras in a first step 10. A plurality of real objects 24, 25, 26, 27 may be recognized in image data 11 with the aid of a recognition algorithm in a second step 20. In addition, the environment may be detected on the basis of geometries, as for example, course 32 of the traffic route. It is also possible to determine the environment on the basis of other sensors, as for example, a proximity radar system. It is also possible to determine the environment on the basis of the current position of the vehicle and road data. The current position may be determined, for example, with the aid of GPS satellite signals.

In a third step 30, a three-dimensional virtual space 31 may be generated from the determined environment and the detected objects 24, 25, 26, 27. Three-dimensional virtual space 31 may be based on measured data being evaluated, as for example, with the aid of image data processing, in order to obtain three-dimensional virtual space 31.

In a fourth step 40, a plurality of virtual objects 52, 53 may be added to three-dimensional virtual space 31 to form virtual reality 41. At least one of virtual objects 52, 53 may be a virtual element 52 being controlled within virtual space 31. In one embodiment in FIG. 1, the controlled virtual element 52 may be embodied as crosshairs whose position within virtual space 31 may be controlled by a user. A fifth step 50 may be a user input 50. In one embodiment in FIG. 1, the interaction of the user may be calculated based on an input via joystick 51. As an alternative or in combination, other inputs are possible, as for example, inputs via a mouse, touch screen or gesture.

In sixth step 60, the recorded image data 11 of the reality may be combined with virtual reality 41 to form an output image 61. The output image 61 may be formed by rendering including the recorded image data 11. In the output image 61, the mixture of the recorded image data 11 and the virtual reality 41 may be controllable, as for example, by a program or a user. It is possible to simplify or change the surrounding of the vehicle in the output image 61. For example, a house may be placed at its origin, but the appearance is changed, as for example, as a haunted house.

In one embodiment in FIG. 1, output image 61 may be output with the aid of display goggles 71. To combine recorded image data 11 of the reality with virtual reality 41, a plurality of virtual elements/objects 52, 53, 56 may be displayed on a plane in front of image data 11 and thus partially cover the image data 11. It is also possible to at least partially hide the plurality of virtual objects 56 temporarily behind the detected object 24, 25, 26, 27. The view of hidden virtual object 56 may be enabled, for example, only after a change in position and/or a change in the viewing angle of a viewer and/or a movement of hidden virtual object 56 and/or a movement of detected object 24, 25, 26, 27.

To enable interaction with detected objects 24, 25, 26, 27, output image 61 may be modified when a first coordinate range of the real object 24, 25, 26, 27 and a second coordinate range of the controlled virtual element 52 form an intersection area. In one embodiment in FIG. 1, the controlled virtual element 52 may have crosshairs 52 which may be positioned by a user in virtual space 41. The controlled virtual element 52 may furthermore have virtual balls which are thrown in a ballistic trajectory within the virtual space 41 as a function of the user input 50. A throwing position and/or a throwing direction and/or a throwing power may be controlled. If a virtual ball strikes a detected object 24, this hit may be indicated. The hit may be indicated by displaying a virtual object 56.

The user may be enabled to act within output image 61 with the aid of virtual reality 41 and, in particular, to interact with a detected object 24, 25, 26, 27. The interaction may be explained on the basis of the game idea, the object of which is to strike certain road signs using virtual balls. The entire environment is recorded at a 360° angle with the aid of a plurality of cameras of the vehicle and combined into a cohesive environment by means of signal processing. In this environment, the road signs may be detected and their positions may be determined within the virtual space 31. With the aid of virtual reality 41, the road signs may be optically modified or specially highlighted in any manner. The result is a video data stream which is provided to the user on a display unit 71. The user now has the option of controlling the crosshairs 52 via the input device 51 and aiming at the road signs. The shooting function on the input device 51 releases the virtual ball, which flies toward the road sign and either strikes or misses it. This means that virtual crosshairs 52 and the virtual ball (not shown in FIG. 1) are superimposed upon the image data 11 and displayed therein. The use of the virtual reality 41 may be expanded to any game situation, game idea, display unit and input device. The application and hardware may be integrated, for example, into the rear seat system of a motor vehicle.

Figure 2:
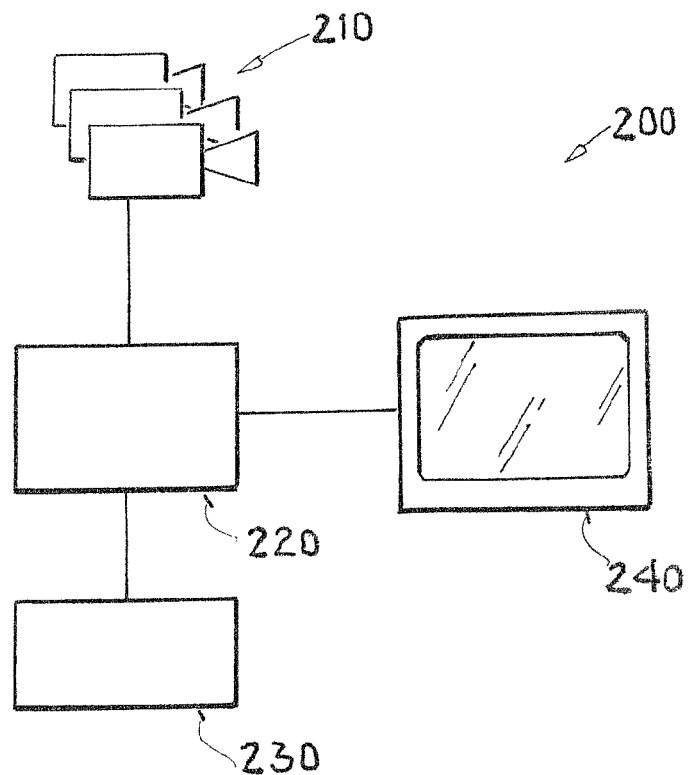
FIG. 2 shows a schematic representation of an augmented reality system.

FIG. 2 shows a schematic representation of one embodiment of an augmented reality system 200 of a motor vehicle. The augmented reality system 200 has an image capture device 210 which may be configured to record an environment of the motor vehicle in the form of image data 11.

The augmented reality system 200 has an arithmetic unit 220 which may be connected to the image capture device 210. In addition, the augmented reality system 200 may have a control unit 230. The control unit 230 may be connected to arithmetic unit 220 and permits user input 50. The control unit 230 in FIG. 2 may be a gamepad 230, a touch-sensitive surface 230, a camera 230 or the like.

The augmented reality system 200 may have a display 240 which may be connected to the control unit 230 for the purpose of displaying an output image 61. One embodiment in FIG. 2 provides an increase of the effect of virtual reality 41 in such a way that the display 240 may be generated without a fixed display unit. This is possible by using a kind of 3D goggles. For this purpose, the rotation of the head may be detected by means of a head tracker and the video content may be adapted to the head orientation. It thus appears to the user as though he/she were looking out the vehicle window and virtual reality 41 were integrated directly into the reality at that point. The acoustics may be adjusted by means of binaural technology and a head tracker.

In one embodiment, the display 240 is implemented by projecting it onto a window pane of the motor vehicle. The output image 61, which may be projected onto the window pane of the motor vehicle, may be visible only from certain angles. The driver may thus be able to drive undisturbed, and the user in the rear seat may still be able to obtain the virtual reality 41 on vehicle windows, whereby the combination of virtual reality 41 and the environment may, in turn, be generated as a superimposition of the game elements and the reality without image data 11 being used for mixing. This embodiment may also be used for a rear seat system.

Figure 3A:
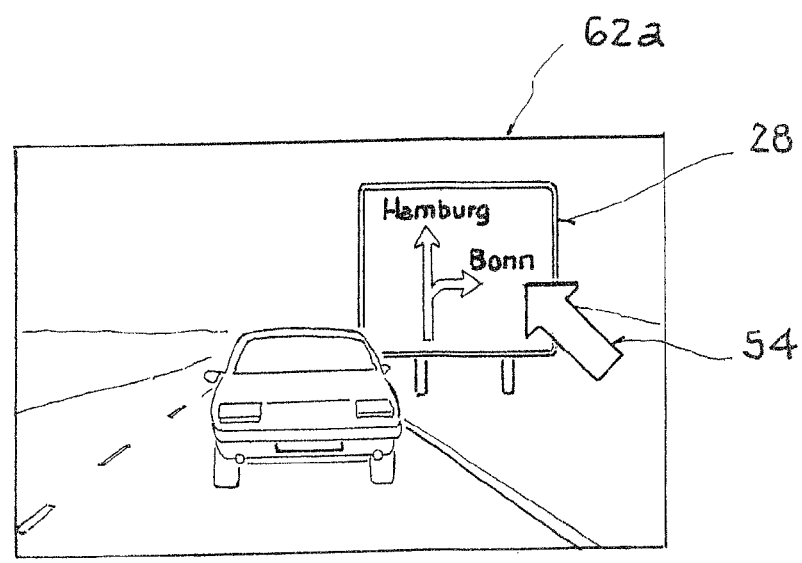

One embodiment is described in FIGS. 3a and 3b, the functionality of the augmented reality system being used to assist the driver. FIG. 3a shows an output image 62a in which a road sign 28 may be shown as a real object 28 in the image data. A cursor 54 may be a virtual element 54 which may be controlled by the driver. FIG. 3a shows that a first coordinate range of real object 28 and a second coordinate range of the controlled virtual element 54 form an intersection area. An output image 62b may be modified accordingly, as illustrated in FIG. 3b. A virtual object 55 may be displayed temporarily in the foreground in order to provide the driver with briefly stored information. The virtual object 55 may be generated from a portion of the image data belonging to the object 28.

The invention is not limited to the embodiments illustrated in FIGS. 1 through 3b. For example, it is possible to detect other objects in the environment of the motor vehicle, such as people or the like. The virtual objects and the type of interaction by the user input may likewise be adapted to the requirements at hand. The functionality of augmented reality system 200 according to FIG. 2 may be particularly advantageously used for an infotainment system of the motor vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for generating an augmented reality with a display of a motor vehicle, the method comprising the steps of:
   recording a stereoscopic image of an environment of the motor vehicle at a 360° angle with the aid of a plurality of cameras of the motor vehicle in the form of stereoscopic image data;
   detecting a three-dimensional course of a road from the stereoscopic image data;
   determining a virtual space in three dimensions from the detected three-dimensional course of the road;
   detecting a real object in the stereoscopic image data;
   determining a first coordinate range of the real object in the three dimensional virtual space;
   adding a virtual element to the three dimensional virtual space, the virtual element having a second coordinate range;
   controlling the virtual element in the three dimensional virtual space based on a user input;

outputting the environment and the controlled virtual element in combined form in an output image;

modifying the output image when the first coordinate range of the real object and the second coordinate range of the controlled virtual element form an intersection area;

projecting the output image onto a window pane of the motor vehicle from certain angles by means of the display of the motor vehicle so that the output image is not visible to a driver of the motor vehicle; and implementing a video game in the three dimensional virtual space, wherein the virtual element is controlled according to a ballistic trajectory in the three dimensional virtual space.

2. The method according to claim 1, wherein the virtual element is controlled in three dimensions in the three dimensional virtual space.

3. The method according to claim 1, wherein the output image is modified by supplementing or replacing object image data of the real object with a virtual object.

4. The method according to claim 1, wherein the output image is modified by generating a virtual object from object image data of the real object and outputting the virtual object in the output image.

5. The method according to claim 1, wherein a viewer position within the three dimensional virtual space is controlled by adapting the image data and the controlled virtual element to the viewer position.

6. An augmented reality system of a motor vehicle, the system comprising:

an image capture device with a plurality of cameras which is configured to record a stereoscopic image of an environment of the motor vehicle at a 360° angle in the form of stereoscopic image data;

an arithmetic unit which is connected to the image capture device;

a control unit which is connected to the arithmetic unit; and a display which is connected to the arithmetic unit displaying an output image;

wherein the arithmetic unit is configured to:
  detect a three-dimensional course of a road from the stereoscopic image data;
  determine a three dimensional virtual space from the detected three-dimensional course of the road;
  detect a real object in the stereoscopic image data;
  determine a first coordinate range of the real object in the three dimensional virtual space;
  add a virtual element having a second coordinate range to the three dimensional virtual space;
  control the second coordinate range of the virtual element in the three dimensional virtual space by means of the control unit based on a user input;
  combine the environment and the controlled virtual element in the output image;
  modify the output image when the first coordinate range of the real object and the second coordinate range of the controlled virtual element form an intersection area; and
  implement a video game in the three dimensional virtual space, wherein the virtual element is controlled according to a ballistic trajectory in the three dimensional virtual space, and wherein the display comprises a projector for projecting the output image onto a window pane from certain angles so that the output image is not visible to a driver of the motor vehicle.

7. The system according to claim 6, wherein the virtual element is controlled in three dimensions in the three dimensional virtual space.

8. The system according to claim 6, wherein the output image is modified by one of supplementing and replacing object image data of the real object with a virtual object.

9. The system according to claim 6, wherein the output image is modified by generating a virtual object from object image data of the real object and outputting the virtual object in the output image.

10. The system according to claim 6, wherein a viewer position within the three dimensional virtual space is controlled by adapting the image data and the controlled virtual element to the viewer position.

11. An augmented reality system in a vehicle, the system comprising:

an image capture device with a plurality of cameras configured to record a stereoscopic image of an environment about the vehicle at a 360° angle to provide stereoscopic image data;

a display for providing an output image; and an arithmetic unit connected to the image capture device and to the display, the arithmetic unit being configured to:
  detect a three-dimensional course of a road from the stereoscopic image data;
  determine a three dimensional virtual space from the detected three-dimensional course of the road;
  detect a real object in the stereoscopic image data;
  determine a first coordinate range of the real object in the three dimensional virtual space;
  add a virtual element having a second coordinate range to the three dimensional virtual space;
  control the second coordinate range of the virtual element in the three dimensional virtual space based on a user input;
  combine the environment and the controlled virtual element in the output image; and
  modify the output image when the first coordinate range of the real object and the controlled second coordinate range of the virtual element form an intersection area; and
  implement a video game in the three dimensional virtual space, wherein the virtual element is controlled according to a ballistic trajectory in the three dimensional virtual space, and wherein the display comprises a projector for projecting the output image onto a window pane from certain angles so that the output image is not visible to a driver of the vehicle.

12. The system of claim 11, wherein the virtual element is controlled in three dimensions in the three dimensional virtual space.

13. The system of claim 11, wherein the output image is modified by one of supplementing and replacing object image data of the real object with a virtual object.

14. The system of claim 11, wherein the output image is modified by generating a virtual object from object image data of the real object and outputting the virtual object in the output image.

15. The system of claim 11, wherein a viewer position within the three dimensional virtual space is controlled by adapting the image data and the controlled virtual element to the viewer position.

* * * * *